United States Patent
Miyoshi (10) Patent No.: US 12,157,525 B2
(45) Date of Patent: Dec. 3, 2024

(54) VIBRATION REDUCING FOR POWER STEERING INVERSELY PROPORTIONAL TO THE STEERING ANGLE

(71) Applicant: HONDA MOTOR CO., LTD., Tokyo (JP)

(72) Inventor: Takashi Miyoshi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 224 days.

(21) Appl. No.: 17/544,435

(22) Filed: Dec. 7, 2021

(65) Prior Publication Data
US 2022/0177027 A1    Jun. 9, 2022

(30) Foreign Application Priority Data

Dec. 9, 2020    (JP) .................................. 2020-203854

(51) Int. Cl.
*B62D 5/04*    (2006.01)
*B62D 6/00*    (2006.01)

(52) U.S. Cl.
CPC .......... *B62D 5/0472* (2013.01); *B62D 5/0463* (2013.01); *B62D 6/008* (2013.01)

(58) Field of Classification Search
CPC ...... B62D 7/22; B62D 5/0472; B62D 5/0463; B62D 6/008; H02P 21/05; H02P 6/10
See application file for complete search history.

(56) References Cited

U.S. PATENT DOCUMENTS

| | | | | |
|---|---|---|---|---|
| 8,326,493 B2 * | 12/2012 | Kezobo | ................ | B62D 5/0463 318/434 |
| 9,043,090 B2 * | 5/2015 | Endo | ...................... | B62D 1/286 318/632 |
| 11,498,611 B2 * | 11/2022 | Endo | ....................... | H02P 27/08 |
| 2012/0061169 A1 | 3/2012 | Oblizajek et al. | | |
| 2012/0185132 A1 | 7/2012 | Kezobo et al. | | |
| 2013/0041557 A1 | 2/2013 | Endo et al. | | |
| 2013/0211677 A1 | 8/2013 | Oblizajek et al. | | |
| 2019/0161112 A1 | 5/2019 | Ito et al. | | |
| 2020/0262472 A1 | 8/2020 | Raad et al. | | |

FOREIGN PATENT DOCUMENTS

| | | |
|---|---|---|
| CN | 102407879 A | 4/2012 |
| CN | 102666257 A | 9/2012 |
| CN | 104044637 A | 9/2014 |
| CN | 110027609 A | 7/2019 |
| CN | 111572631 A | 8/2020 |
| JP | 2011-025829 A | 2/2011 |

OTHER PUBLICATIONS

Chinese Office Action received in corresponding Chinese application No. 202111421626.6 dated Mar. 1, 2024 with English translation (11 pages).

* cited by examiner

*Primary Examiner* — Gonzalo Laguarda
(74) *Attorney, Agent, or Firm* — Rankin, Hill & Clark LLP (57) ABSTRACT

An electric power steering device includes a torque sensor provided between a steering wheel and steered wheels mounted on a vehicle body; an assist device that adds an assist force when the steered wheels are steered according to a torque detected by the torque sensor; and a vibration suppressor that outputs a vibration suppressing force from the assist device to suppress a vibration of a steering system according to a signal of a predetermined frequency band of the torque.

6 Claims, 7 Drawing Sheets

VIBRATION REDUCING FOR POWER STEERING INVERSELY PROPORTIONAL TO THE STEERING ANGLE

BACKGROUND OF THE INVENTION

Field of the Invention

The present invention relates to an electric power steering device.

Description of the Related Art

Conventionally, in order to decrease a physical load when a driver manually operates a steering member such as a steering wheel, an electric power steering device having an assist motor to transmit an assist force related to the manual operation of the steering member by the driver to a turning system including the steering member and a turning device has been known.

The electric power steering device is a steering device in which tires and the steering wheel are connected via a rack shaft or a steering shaft. It is known that this type of steering device generates a vibration called a shimmy phenomenon during vehicle operation. When the shimmy phenomenon occurs, for example, the steering wheel rotates like a swing motion, and cause a loss of comfort.

Patent Literature 1 discloses a method for suppressing and eliminating the shimmy phenomenon by adding (subtracting) a value detected by a torque sensor and filtered by a BPF (Band Pass Filter) to (from) an assist control value to suppress a steering wheel vibration.

RELATED ART DOCUMENT(S)

Patent Literature(s)

Patent Literature 1: JP2011-025829A

SUMMARY OF THE INVENTION

The vibration that occurs in the steering wheel is considered to be a vibration caused by a resonance of a vehicle body transmitted through a steering mounting part. This resonance of the vehicle body does not always occur, but only under specific conditions. For this reason, if a vibration suppressing control is always performed as disclosed in Patent Literature 1, a vibration will be suppressed even when the vehicle body is not resonating. For this reason, information to be transmitted to the driver, such as load surface information, may also be attenuated.

An object of the present invention is to provide an electric power steering device that can appropriately suppress a vibration generated in a steering system.

In order to achieve the above object, an electric power steering device of the present invention includes a torque sensor provided between a steering wheel and steered wheels mounted on a vehicle body; an assist device that adds an assist force when the steered wheels are steered according to a torque detected by the torque sensor; and a vibration suppressor that outputs a vibration suppressing force from the assist device to suppress a vibration of a steering system according to a signal of a predetermined frequency band of the torque.

The vibration suppressor is controlled to output the vibration suppressing force when a rotational speed detected by a rotational speed detector that detects a rotational speed of a power device that drives the vehicle is a predetermined value.

According to the present invention, an electric power steering device that appropriately suppresses the vibration generated in the steering system can be provided.

DESCRIPTION OF THE EMBODIMENTS

Figure 1:
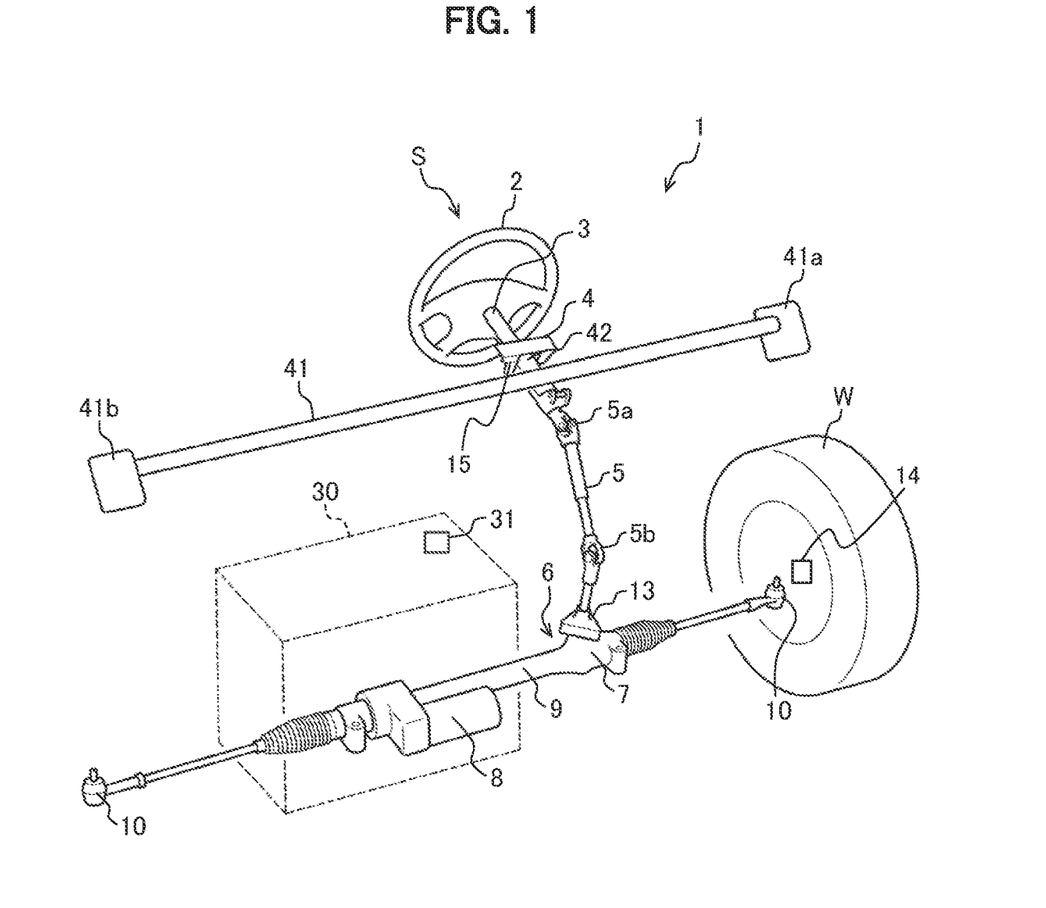
FIG. 1 is a schematic view of an electric power steering device of an embodiment of the present invention.
Figure 2:
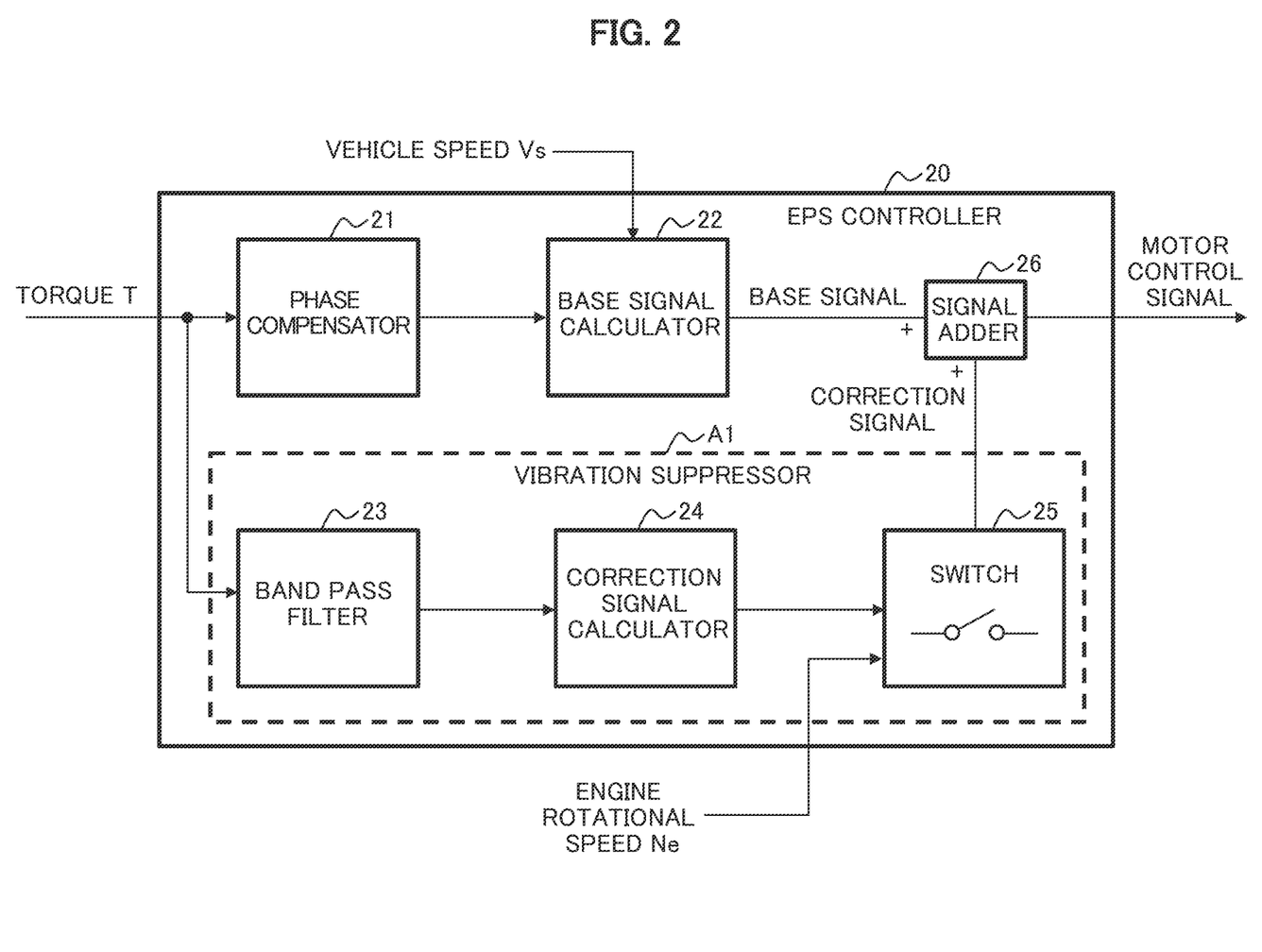
FIG. 2 is a block diagram of an EPS controller in an electric power steering device according to a first embodiment of the present invention.

Referring to FIG. 1 to FIG. 7, embodiments of the present invention applied to a rack assist type electric power steering device will be described in detail. FIG. 1 is a schematic view of an electric power steering device according to the embodiments. FIG. 2 is a block diagram of an EPS controller according to the first embodiment. The present invention may be modified without departing from the sprit and scope thereof.

First, referring to FIG. 1, the whole structure of an electric power steering device 1 will be described.

The electric power steering device 1 includes a steering system S from a steering wheel 2 to wheels W, W (front wheels, which are steered wheels), an EPS controller 20 (see FIG. 2) which controls an electric motor 8 that applies an assist force to a manual steering device of the steering system S, and so on. The term "EPS" means Electric Power Steering.

The manual steering device of the steering system S includes a steering wheel 2 that is steered by a driver, a steering shaft 3 that is integrated with the steering wheel 2, a column 4 that surrounds the steering shaft 3, and a rack-and-pinion device 7 that is connected to the steering shaft 3 via a connecting shaft 5. The rack-and-pinion device 7 is provided in a steering gear box 6. A pinion of the rack-and-pinion device 7 is integrally rotated with the connecting shaft 5. In addition, both ends of the connecting shaft 5 are provided with universal joints 5a and 5b to absorb an angular phase misalignment between the steering shaft 3 and the pinion. In the rack-and-pinion device 7, rack teeth that engage with the pinion are formed on a rack shaft 9. When the pinion engages the rack teeth, a rotary motion of the pinion is converted into a reciprocating motion in a lateral direction (a vehicle width direction) of the rack shaft 9. The right and left wheels W, W are connected to both ends of the rack shaft 9 via tie rods 10, 10.

In the electric power steering device 1 of this embodiment, the electric motor 8 is located in the vicinity of the rack shaft 9 in order to generate an assist force. A rotational force of the electric motor 8 is converted into thrust by a ball screw device 11 provided coaxially with the rack shaft 9, and this thrust acts on the rack shaft 9 (a ball screw axis) as the assist force.

The torque sensor 13 is provided in the steering gear box 6 and detects a magnitude and a direction of the torque (steering input) applied by the driver to the steering wheel 2. Then, the torque sensor 13 outputs an electric signal corresponding to the detected torque to the EPS controller 20 as a detected torque value (torque T). In addition, the torque T includes information indicating the magnitude and information indicating the direction. The information indicating the direction is expressed as a plus value or a minus value. For example, the plus value means that the direction of the torque T is right direction, and the minus value means that the direction of the torque T is left direction. The torque T detected by the torque sensor 13 is processed as a digital signal in the EPS controller 20.

In addition, this specification does not consider the direction of the torque (a sign of torque), such as right steering or left steering, or advance and return of the steering, etc., in order to prevent descriptions from complications.

Next, an engine rotation sensor 31 (a rotational speed detector) detects an engine rotational speed Ne. This engine rotation sensor 31, for example, calculates the engine rotational speed Ne for every predetermined rotational angle based on a pulse associated with a rotation of the crank shaft of the engine 30. A wheel speed sensor 14 outputs a wheel speed pulse associated with a rotation of a wheel W. The wheel W is provided with the wheel speed sensor. For example, a vehicle speed Vs (a vehicle body speed) is calculated based on the wheel speed pulse output by wheel speed sensors 14 of the right and left driven wheels. This wheel speed sensor 14 also functions as a vehicle speed sensor.

A steering angle sensor 15 (a steering angle detector) detects, for example, a rotational angle of the steering shaft 3 and a position of the rack shaft 9. This steering angle sensor 15 is used in a second embodiment.

As shown in FIG. 1, the vehicle to which the electric power steering device 1 is applied has an engine 30 mounted on the vehicle body (not shown) as a power device to drive the vehicle. The electric power steering device 1 (the steering system S) is fixed to the vehicle body or supporting member at a plurality of points. The steering shaft 3 is fixed to a mounting part 42 of a steering hanger beam 41 extending in the vehicle width direction at a position of or in the vicinity of the column 4. The steering hanger beam 41 is fixed to the vehicle body (not shown) with vehicle body mounting parts 41a and 41b at both ends as a supporting member of the electric power steering device 1. In addition, in this example, the steering hanger beam 41 is fixed to the vehicle body (not shown) with vehicle body mounting parts 41a and 41b at both ends as a supporting member of the electric power steering device 1. In addition, in this example, the steering shaft 3 is located below the steering hanger beam 41.

In this way, the steering system S is fixed to the steering hanger beam 41. Because the steering hanger beam 41 is fixed to the vehicle body on which the engine 30 is mounted, the vibration of the engine 30 is transmitted to the steering hanger beam 41 through the vehicle body. The steering hanger beam 41 resonates depending on the rotational speed of the engine 30. The vibration caused by the resonance becomes the vibration phenomenon described in the Description of the Related Art, which impairs the comfortability of the driver.

First Embodiment

Next, referring to FIG. 2, an EPS controller 20 will be described as the first embodiment of the present invention that suppresses a vibration caused by a resonance. FIG. 2 is a block diagram of the EPS controller in the electric power steering device according to the first embodiment of the present invention.

The EPS controller 20 includes a microcomputer (not shown) and peripheral circuits (not shown). The microcomputer reads a program stored in a ROM and executes each module of the program (a phase compensator 21, a base signal calculator 22, a band pass filter 23, a correction signal calculator 24, a switch 25, and a signal adder 26, etc.) to control the electric power steering device 1. In order to control the electric power steering device 1, the EPS controller 20 is provided with input/output ports to input/output a variety of signals, information, and instructions, etc., an A/D converter to convert analog signals into digital signals for digital processing by the microcomputer, and a D/A converter to convert the digital signals processed by the microcomputer into analog signals.

In addition, in the EPS controller 20 shown in FIG. 2, components that are not relevant to solving the problem are omitted.

The components of the EPS controller 20 shown in FIG. 2 will be described below.

In order to compensate for the response delay of the steering system S when the driver operates the steering wheel 2, the phase compensator 21 advances the phase of the torque T detected by the torque sensor 13 to generate a phase compensated torque T. The phase compensator 21 outputs the phase compensated torque T to the base signal calculator 22 at the next stage.

The base signal calculator 22 calculates a base signal (a current value) for driving the electric motor 8 based on the phase compensated torque T and the vehicle speed Vs, and outputs the base signal (the current value) to the signal adder 26 at the next stage. A base map shown in FIG. 3A is referred to when the base signal is calculated.

Figure 3A:
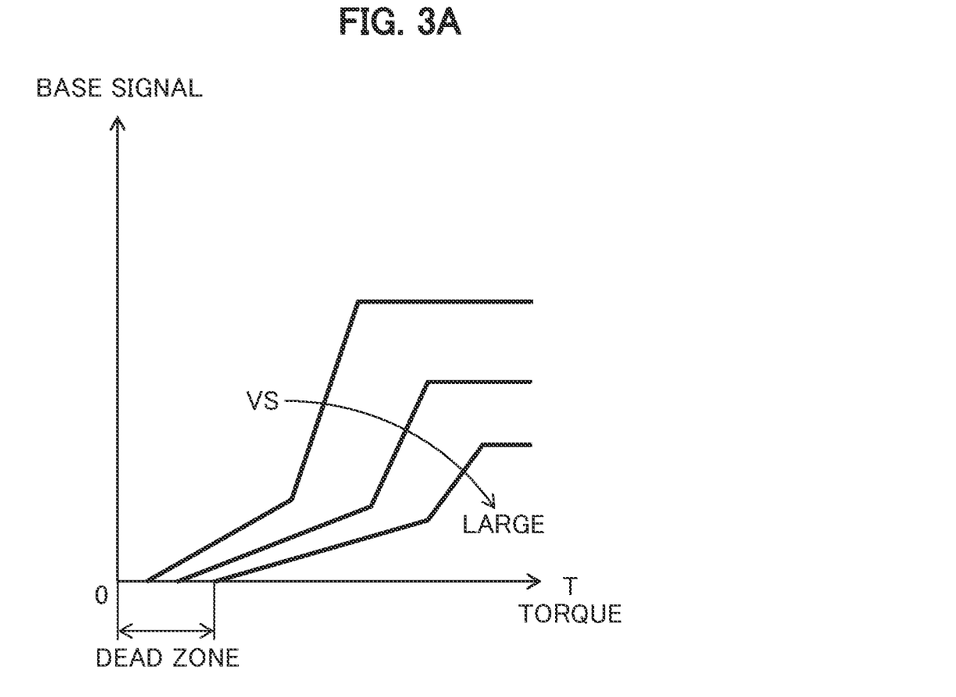
FIG. 3A shows a base map that is referred to in FIG. 1 when a base signal from a torque detected by a torque sensor is calculated.

FIG. 3A shows the base map that is referred to when the base signal is calculated based on the torque detected by the torque sensor. In this base map, the larger the value of the torque T, the larger the current value of the base signal, and the larger the assist force generated by the electric motor 8. In addition, because a load surface reaction force is large at low vehicle speeds, the slower the vehicle speed Vs (the smaller the value), the larger the value of the base signal is set.

Figure 3B:
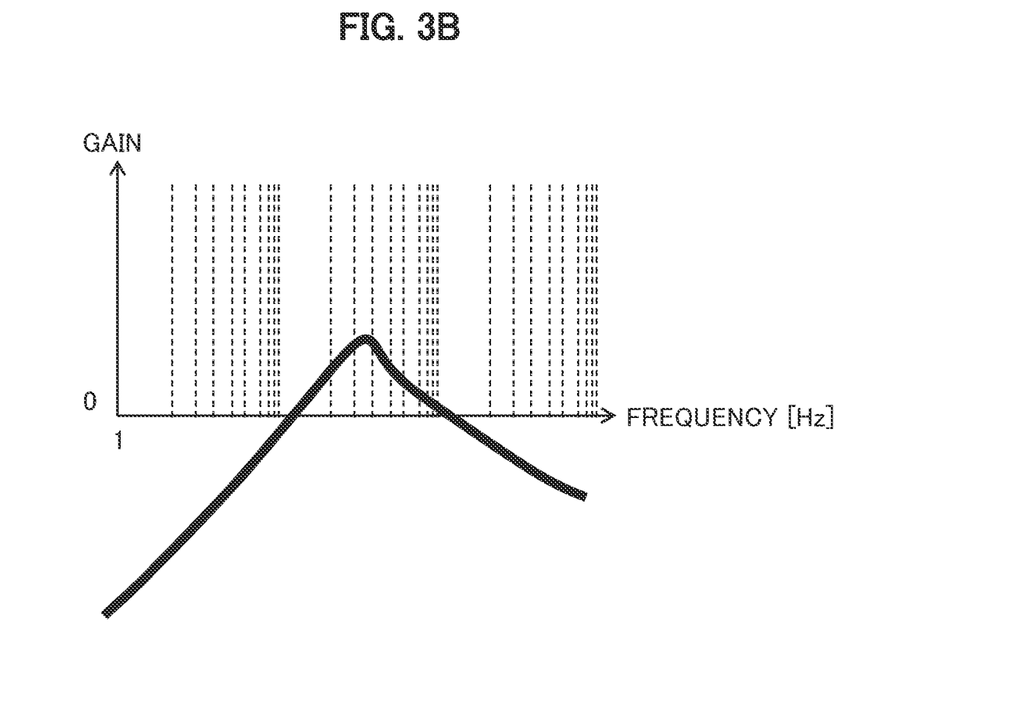
FIG. 3B shows a filter characteristics (a relationship between a torque frequency and a gain) of a band pass filter that is referred to when a correction signal is calculated from a frequency of a torque detected by a torque sensor in FIG. 1.

The band pass filter 23 generates a gain-multiplied torque signal according to a frequency of the torque T detected by the torque sensor 13, and outputs the gain-multiplied torque signal to the correction signal calculator at the next stage. FIG. 3B shows a filter characteristics (a relationship between the frequency of the torque T and the gain) of the band pass filter 23 that is referred to when the correction signal is calculated based on the frequency of the torque T detected by the torque sensor 13. In this filter characteristics shown in FIG. 3B, a horizontal axis is the frequency (Hz) of the torque T, and a vertical axis is the gain (dB). 0 dB in the vertical axis means that the gain equals to 1. The minus value in the vertical axis means a fraction such as, for example, 1/n, where n is a value greater than 1.

In the filter characteristics of this band pass filter 23, the gain is high in a region where the frequency of the torque T corresponds to the resonance frequency of the steering hanger beam 41. In other words, the gain is high in a frequency range (a predetermined frequency band) of the torque T that corresponds to a predetermined rotational speed range (a rotational speed band) of the engine 30. The vibration of the steering hanger beam 41 is transmitted to the mounting part 42, the steering shaft 3, the connecting shaft 5, the steering gear box 6, and the torque sensor 13 in the steering gear box 6. Accordingly, the vibration of the steering hanger beam 41 is reflected in the frequency of the torque T detected by the torque sensor 13. For this reason, the frequency of the torque T in the horizontal axis of FIG. 3B is related to the vibration of the steering hanger beam 41.

Next, the correction signal calculator 24 converts the gain input from the band pass filter 23 into the current value of the correction signal in order to add the correction signal to the current value of the base signal in the signal adder 26. Then, the correction signal calculator 24 outputs the correction signal to the switch 25 at the next stage. This correction signal cancels (attenuates) the vibration phenomenon.

Figure 5A:
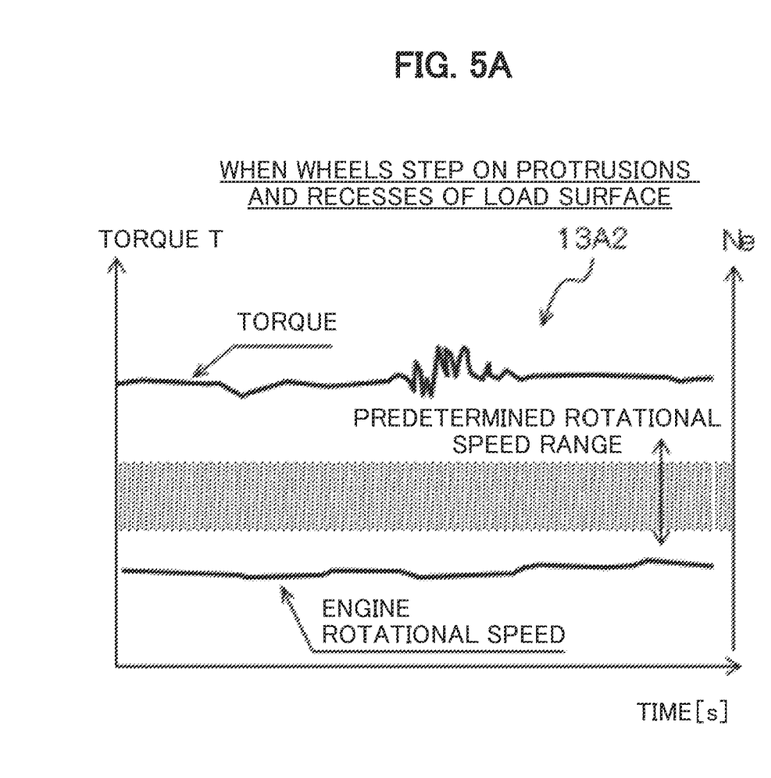
FIG. 5A is a diagram of FIG. 4A with an engine rotational speed and a predetermined rotational speed range of an engine that resonates a steering hanger beam.
Figure 5B:
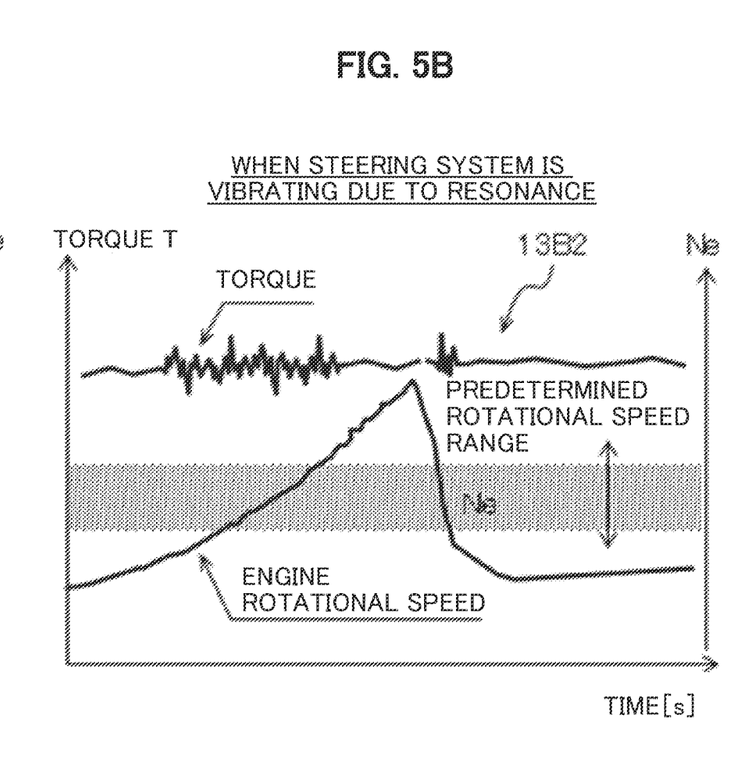
FIG. 5B shows a diagram of FIG. 4B with an engine rotational speed and a predetermined rotational speed range of the engine that resonates the steering hanger beam.

When the engine rotational speed Ne detected by the engine rotation sensor 31 is within the predetermined rotational speed range, the switch 25 outputs the correction signal input from the correction signal calculator 24 to the signal adder 26 at the next stage. Here, the predetermined rotational speed range of the engine 30 where the switch 25 is turned ON is the "engine rotational speed range that matches the resonance frequency" that resonates the steering hanger beam 41. FIGS. 5A and 5B show upper and lower limits of the rotational speed of this predetermined rotational speed range. When the engine rotational speed Ne is within this predetermined rotational speed range, the steering hanger beam 41 resonates, and the vibration phenomenon occurs. In addition, when the engine rotational speed Ne is not within the predetermined rotational speed range (a predetermined value), the switch 25 is turned OFF. When the switch is turned OFF, the correction signal is not added in the signal adder 26. The vibration suppressor A1 includes the band pass filter 23, the correction signal calculator 24, and the switch 25.

In addition, the switch 25 corresponds to a "vibration occurrence determining device".

The signal adder 26 adds the correction signal (a correction current value) input from the switch 25 to the base signal (a base current value) input from the base signal calculator to generate a motor control signal (a target current value), and outputs the motor control signal (the target current value) to the electric motor controller (an inverter) (not shown). In addition, when the rotational speed of the engine 30 is within the predetermined rotational speed range, the switch 25 is turned ON, and the correction signal is added to the base signal to cancel the vibration phenomenon.

In addition, the direction (the sign) of torque is not considered in this specification.

Figure 4A:
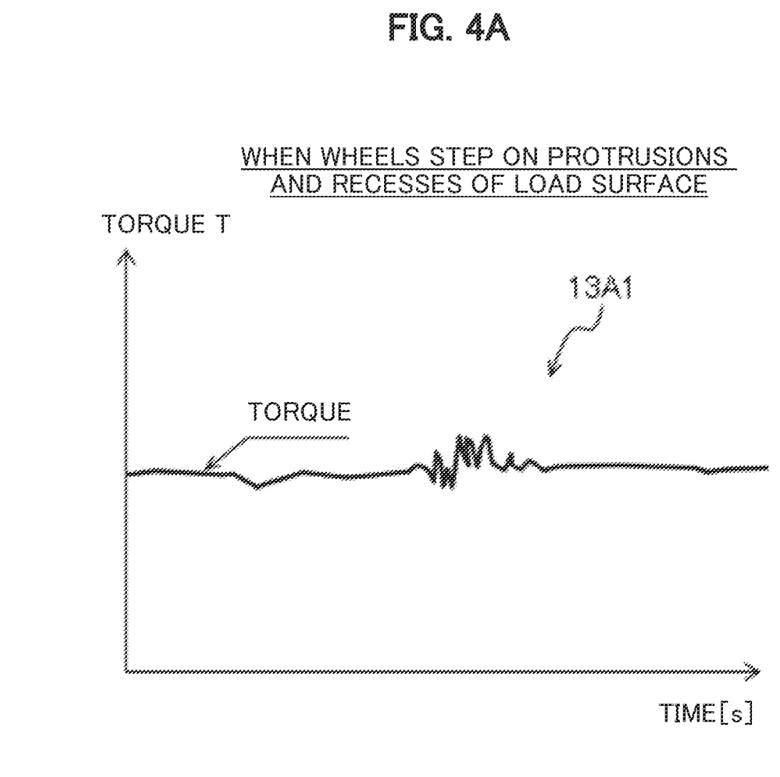
FIG. 4A shows a temporal changes in the torque detected by the torque sensor when wheels step on protrusions and recesses of a load surface in a vehicle provided with the electric power steering device of FIG. 1.
Figure 4B:
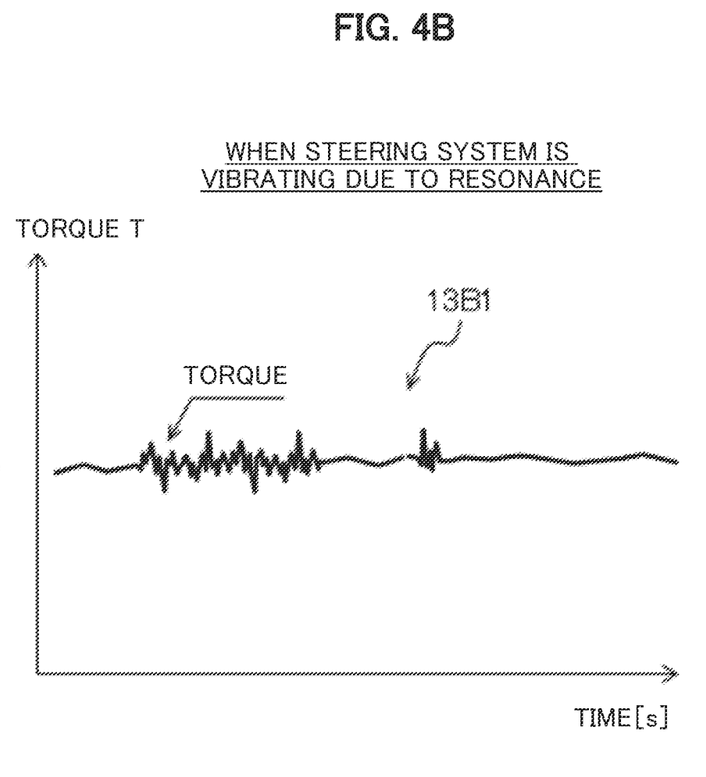
FIG. 4B shows a temporal changes in the torque detected by the torque sensor when the steering system is vibrating due to a resonance in a vehicle provided with the electric power steering device of FIG. 1.

Next, referring to FIGS. 4A and 4B and FIGS. 5A and 5B, the operation of the electric power steering device 1 in the first embodiment will be described. FIG. 4A shows a temporal changes in the torque when the wheels step on protrusions and recesses of the load surface in a vehicle provided with the electric power steering device 1, and FIG. 4B shows a temporal changes in the torque when the steering system S is vibrating due to resonance in the vehicle provided with the electric power steering device 1. FIGS. 5A and 5B show diagrams of FIGS. 4A and 4B with the rotational speed of the engine 30 and the predetermined rotational speed range of the engine 30 that resonates the steering hanger beam 41.

(Control when Wheels Step on Protrusions and Recesses of Load Surface)

A line 13A1 in FIG. 4A shows a temporal changes in the torque detected by the torque sensor when wheels W, W step on the protrusions and recesses of the load surface.

This line 13A1 shows the temporal changes in the torque detected by the torque sensor 13 when the wheels W, W step on the protrusions and recesses of the load surface under conditions of a straight traveling, a turning with a constant curvature, a driving on a cant road with constant slope, or a driving in a situation where cross wind blows with a constant wind speed, etc. during which the torque T is zero or approximately constant. A line 13A2 of FIG. 5A, which corresponds to the line 13A1 of FIG. 4A, shows that the engine rotational speed Ne is almost constant, and is not within the predetermined rotational speed range (the predetermined value) that resonates the steering hanger beam 41.

Referring to FIG. 2, the operation of the EPS controller 20 in this case will be described. The torque sensor 13 detects the torque T and outputs the torque T to the EPS controller 20. The torque T is phase-compensated by the phase compensator 21. As a result, the response delay of the steering system S is compensated. The phase compensated torque T is output to the base signal calculator 22. Referring to the map of FIG. 3A, the base signal calculator 22 calculates the base signal (the current value) to drive the electric motor, and outputs the base signal to the signal adder 26. In addition, as shown in FIG. 3A, the vehicle speed Vs is also used to calculate the base signal.

The torque sensor 13 detects the torque T and outputs the torque T to the band pass filter 23. According to the filter characteristics in FIG. 3B, the band pass filter 23 generates a gain-multiplied torque signal corresponding to the frequency of the torque T, and outputs the gain-multiplied torque signal to the correction signal calculator 24 at the next stage. The correction signal calculator 24 calculates the correction signal (the current value) based on the gain (the torque signal (the torque value)).

The switch 25 at the next stage is turned ON/OFF according to the engine rotational speed Ne. When the switch 25 is turned ON, the correction signal calculated by the correction signal calculator 24 is output to the signal adder 26. The line 13A2 in FIG. 5A shows that the engine rotational speed Ne is not within the predetermined rotational speed range that resonates the steering hanger beam 41. For this reason, the signal adder 26 outputs the base signal calculated by the base signal calculator 22 to the electric motor controller (not shown) as the motor control signal (the target current value). In other words, in the example shown in the line 13A2 of FIG. 5A (when the wheels step on the protrusions and recesses on the load surface), the correction signal of the vibration suppressor A1 is not reflected in the control executed by the EPS controller 20.

For this reason, the information that the wheels stepped on the protrusions and recesses of the load surface is transmitted to the driver as load surface information without attenuation.

(Control when Torque Changes Due to Resonance)

The line 13B1 in FIG. 4B shows the temporal changes in the torque detected by the torque sensor when the steering system is vibrating due to resonance.

This line 13B1 shows the temporal changes in the torque detected by the torque sensor 13 when the steering hanger beam 41 resonates at the engine rotational speed range (the predetermined rotational speed range) that matches the resonance frequency of the steering hanger beam 41 under the condition where the vehicle is stopped, or the vehicle is traveling during which the torque T is zero or approximately constant.

As shown in a line 13B2 of FIG. 5B, which corresponds to the line 13B1 of FIG. 4B, the driver increased the engine rotational speed Ne at a constant rate, and then decreased the engine rotational speed Ne rapidly. As a result, the engine rotational speed Ne passed through the predetermined rotational speed range twice during increasing and decreasing the engine rotational speed Ne. In this case, the vibration caused by the rotation of the engine 30 is transmitted to the steering hanger beam 41 through the vehicle body, causing resonance. The vibration caused by the resonance of the steering hanger beam 41 is transmitted to the mounting part 42, the steering shaft 3, the connecting shaft 5, the steering gear box 6, and the torque sensor 13 in the steering gear box 6. Accordingly, the vibration of the steering hanger beam 41 is reflected in the frequency of the torque T detected by the torque sensor 13. In addition, the increasing and decreasing of the engine rotational speed Ne can occur not only when the vehicle is traveling, but also when the vehicle is stopped and the engine is idling.

Referring to FIG. 2, the operation of the EPS controller 20 when the torque changes due to resonance will be described. The calculation of the base signal is the same as the calculation of the base signal in the control when the wheels step on the protrusions and recesses of the load surface. On the other hand, the calculation of the correction signal in the vibration suppressor A1 differs in the following points. In the engine rotational speed range that coincides with the resonance frequency, i.e., in the predetermined rotational speed range (a situation in which resonance occurs and torque T changes), the frequency of the torque T detected by the torque sensor 13 is within a high gain region in FIG. 3B. For this reason, in the predetermined rotational speed range, the torque value output from the band pass filter 23 to the correction signal calculator 24 is high, and the calculated correction signal (current value) is a value corresponding to the gain (torque value). When the engine rotational speed Ne is within the predetermined rotational speed range, the switch 25 (vibration occurrence determining device) is turned ON.

Accordingly, when the torque changes due to the resonance, the signal adder 26 adds the correction signal from the vibration suppressor A1 to the base signal from base signal calculator 22, and the electric motor 8 generates a vibration suppressing force. For this reason, in the predetermined rotational speed range of the engine 30 where resonance occurs, the vibration of the steering wheel 2 and the steering shaft 3 is effectively suppressed, and the vibration phenomenon is suppressed. On the other hand, in the rotational speed range of engine 30 where no resonance occurs, the switch 25 is not turned ON. For this reason, the vibration suppressing control is not performed, and the load surface information can be properly transmitted to the driver.

In addition, the band pass filter 23 of FIG. 3B has a characteristic of increasing a gain in the frequency range of the torque T corresponding to the predetermined rotational speed range of the engine 30 that resonates the steering hanger beam 41. For this reason, even if the switch 25 is omitted, the vibration can be suppressed when necessary. That is, according to the characteristics of the band pass filter 23 shown in FIG. 3B, when no resonance occurs in the steering hanger beam 41, the correction signal output by the vibration suppressor A1 is small. On the other hand, when the resonance occurs, the correction signal output by the vibration suppressor A1 is a value that can appropriately suppress the vibration. According to the characteristics of the band pass filter 23 shown in FIG. 3B, the vibration suppressing control can be performed by using the switch 25 only when necessary. In other words, the vibration suppressing control can be performed only at the predetermined rotational speed range of the engine 30 that resonates the steering hanger beam 41.

A supplement is added to the above point. For example, when the engine rotational speed Ne is not within the predetermined rotational speed range, the frequency of the torque T may become a frequency with a high gain of the filter in FIG. 3B due to the vibration input through the wheel W. However, the frequency of the torque T with the high gain is not due to the resonance of the steering hanger beam 41 caused by the rotation of the engine 30. The vibration input through the wheel W is the load surface information. In this case, the switch 25 is not turned ON. Accordingly, the vibration suppressing control is not performed, and the load surface information can be properly transmitted to the driver.

In other words, according to the first embodiment, the vibration suppression is performed according to the rotational speed of the power device (the engine 30), which is a generation source of the vibration applied from the vehicle body to the steering system S. Accordingly, when no resonance is generated by the rotation of the power device, the vibration suppression control is not performed. As a result, the load surface information can be properly transmitted to the driver. On the other hand, when the resonance is caused by the rotation of the power device, the vibration caused by the resonance can be suppressed appropriately. In other words, according to the first embodiment, the electric power steering device 1 that can appropriately suppress the vibration generated in the steering system S can be provided.

Hereinafter, a detailed description of a configuration and effects of the first embodiment will be described.

In the first embodiment, the steering system S is attached to the vehicle body by the mounting part 42 (see FIG. 1). The predetermined frequency band of the torque T is a resonance frequency of the mounting part 42, and the predetermined value (the predetermined rotational speed range) is a rotational speed range of the engine 30 at which the mounting part 42 resonates.

According to this configuration, the vibration suppressing control is performed only when the resonance of the mounting part 42 is transmitted to the steering system S. Therefore, when the mounting part 42 does not resonate, the load surface information can be transmitted to the driver.

In the first embodiment, the steering hanger beam 41 is provided between the walls on both sides of the vehicle body (a vehicle compartment) in the vehicle width direction, and the steering system S (the column 4) is attached to the steering hanger beam 41 (see FIG. 1). The predetermined frequency band of the torque T is the resonance frequency of the steering hanger beam 41, and the predetermined value (the predetermined engine rotational speed range) is the engine rotational speed range at which the steering hanger beam 41 resonates.

According to this configuration, the vibration suppressing control is performed only when the resonance of the steering hanger beam 41 is transmitted to the steering system S (the steering wheel 2). Therefore, when the steering hanger beam 41 does not resonate, the load surface information can be transmitted to the driver.

In the first embodiment, when the switch 25, which is turned on and off according to the engine rotational speed Ne, determines that the steering system S vibrates due to the resonance as a "vibration occurrence determining device", the vibration suppressor A1 outputs a vibration suppressing force (a correction signal). On the other hand, when the switch 25 determines that the steering system S does not vibrate due to the resonance, the vibration suppressor A1 does not output a vibration suppressing force (a correction signal).

According to this configuration, unnecessary vibration control can be prevented when there is no resonance, and the load surface information can be transmitted to the driver.

In addition, the "vibration occurrence determining device" is not limited to the switch 25 that turns on and off according to the engine rotational speed Ne. In addition to the method of estimating the resonance based on the engine rotational speed Ne, the following methods can be used: (1) a method of estimating based on the vehicle speed and gear position, (2) a method of estimating based on the wheel speed sensor 14 and the gear position of the shift device, (3) a method of directly providing an acceleration sensor on the vehicle body (the steering hanger beam 41), and (4) a method of estimating based on the situation of vibration sources other than the engine that excite steering hanger beam 41 (e.g., a tire outline (a tire unbalance), a wheel side portion, etc.).

In addition, in the first embodiment, the control is performed based on a "first viewpoint" where the vibration suppressor A1 "outputs" (permits the output of) the vibration suppressing force (the correction signal) and a "second viewpoint" where the vibration suppressor A1 "stops and/or limits" the output of the vibration suppressing force (the correction signal).

In other words, in the "first viewpoint", when the rotational speed (the engine rotational speed Ne) detected by the rotational speed detector (the engine rotation sensor 31), which detects the rotational speed of the power device (the engine 30), is the predetermined value (the predetermined rotational speed range), the vibration suppressor A1 "outputs" a vibration suppressing force (a correction signal).

In other words, based on a determination of the vibration occurrence determining device (the switch 25), the vibration suppressor A1 "outputs" (permits to output) the vibration suppressing force (the correction signal).

In the "second viewpoint", based on the rotational speed (the engine rotational speed Ne) detected by the rotational speed detector (the engine rotation sensor 31), which detects the rotational speed of the power device (the engine 30), and/or the steering angle (a steering angle θ) detected by the steering angle detector (the steering angle sensor 15), which detects the steering angle of the steered wheel. the vibration suppressor A1 "stops and/or limits the output" of the vibration suppressing force (the correction signal). In addition, in the first embodiment, the vibration suppressor A1 "stops the output" of the correction signal based on the engine rotational speed Ne.

The "first viewpoint" is compatible with the "second viewpoint", and their technical features "correspond" to each other. That is, the "first viewpoint" and the "second viewpoint" transmit the load surface information, while suppressing the vibration caused by the resonance.

Second Embodiment

Next, referring to FIG. 6, a second embodiment of the present invention that suppresses a vibration caused by a resonance will be described.

Figure 6:
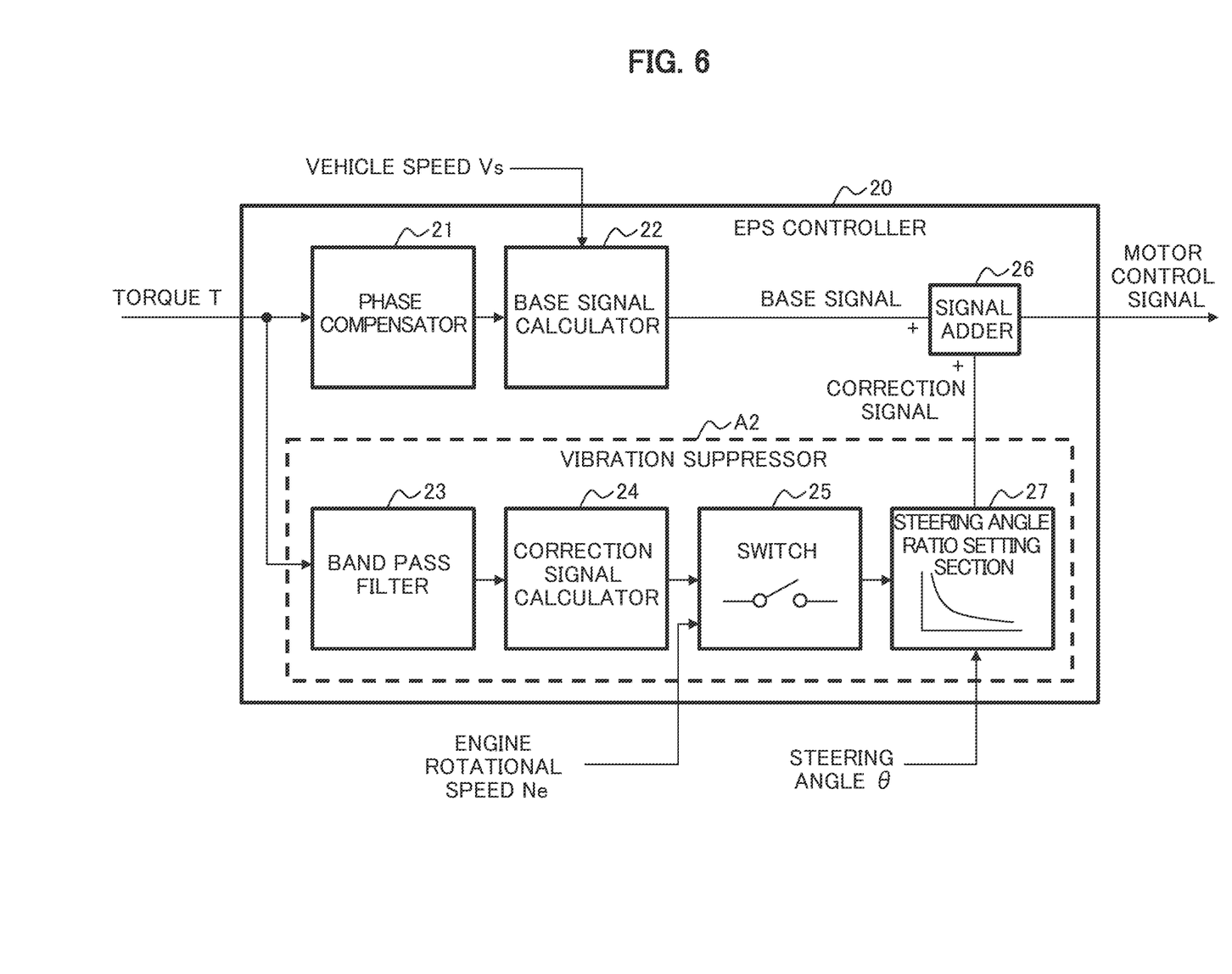
FIG. 6 is a block diagram of an EPS controller of a second embodiment of the present invention.

FIG. 6 is a block diagram of an EPS controller according to the second embodiment of the present invention. In this second embodiment, a vibration suppressor A2 differs from the vibration suppressor A1 of the first embodiment in the following points. The vibration suppressor A2 of the second embodiment has a steering angle ratio setting section 27. The other components are the same as those of the first embodiment, so duplicate descriptions will be omitted.

The steering angle ratio setting section 27 shown in FIG. 6 adjusts the correction signal input from the switch 25 according to (inversely proportional to) the steering angle θ detected by the steering angle sensor 15. The steering angle ratio setting section 27 does not adjust the correction signal when the steering angle θ is zero, and decreases the correction signal as the steering angle increases.

The operation of the second embodiment will be described below. Like the first embodiment, when the engine rotational speed Ne is within the predetermined rotational speed range in the second embodiment, the switch 25 is turned ON. The correction signal calculator 24 calculates the correction signal and outputs the correction signal to the steering angle ratio setting section 27 via the switch 25. The steering angle sensor 15 detects the steering angle θ, and outputs the steering angle θ to the steering angle ratio setting section 27. The steering angle ratio setting section 27 adjusts the correction signal according to the steering angle θ.
(Straight Traveling or Traveling with a Small Steering Angle)

When the vehicle is traveling straight or traveling with a small steering angle, the switch 25 is turned ON if the engine rotational speed Ne is within the predetermined rotational speed range that resonates the steering hanger beam 41. For this reason, the switch 25 outputs the correction signal for vibration suppression calculated by the correction signal calculator 24 to the steering angle ratio setting section 27.

The steering angle θ is zero or a small value because the vehicle is traveling straight or traveling with a small steering angle. For this reason, the steering angle ratio setting section 27 outputs the correction signal input from switch 25 as it is or a smaller value than the input correction signal to the signal adder 26. Therefore, the vibration caused by the resonance is appropriately suppressed.
(Turning)

When the vehicle is turning, the switch 25 is turned ON if the engine rotational speed Ne is within the predetermined rotational speed range that resonates the steering hanger beam 41. For this reason, the switch 25 outputs the correction signal for vibration suppression calculated by the correction signal calculator 24 to the steering angle ratio setting section 27. The difference from the case of the straight traveling is that the steering angle θ is not zero or a small value due to the turning. For this reason, the steering angle ratio setting section 27 outputs a smaller correction signal than the correction signal input from switch 25 to the signal adder 26 in inverse proportion to the steering angle θ. In other words, the vibration suppressing force that suppresses the vibration caused by the resonance is suppressed.

The reason why the correction signal becomes smaller in inverse proportion to the steering angle θ is that the driver wants to know the load surface information and the feeling of tire grip while the vehicle is turning. In other words, like the straight traveling and the traveling with the small steering angle, if the vibration suppression is performed during the turning, not only the vibration caused by the resonance but also the load surface information will be suppressed. If the steering angle ratio setting section 27 makes the correction signal small, the vibration caused by the resonance cannot be effectively suppressed. On the other hand, the load surface information can be transmitted to the driver.

According to this second embodiment, during the turning when the driver wants to know the load surface information, the output of the vibration suppressing control is decreased to make it easier for the load surface information to be transmitted to the driver. On the other hand, during the straight traveling, the driver is more concerned about the vibration caused by the resonance than the load surface information, so the vibration suppression is performed. In other words, even in the second embodiment, the electric power steering device 1 that can appropriately suppress the vibration generated in the steering system S can be provided.

In addition, like the first embodiment, in the second embodiment, the control is performed based on the "first viewpoint" where the vibration suppressor A2 "outputs" (permits to output) the vibration suppressing force (the correction signal) and the "second viewpoint" where the vibration suppressor A2 "stops and/or limits" the output of the vibration suppressing force (the correction signal).

In the "second viewpoint" of the second embodiment, the steering angle ratio setting section 27 is provided after the switch 25, so that the "stopping and limiting of output" of the correction signal is also performed.

The effects of this second embodiment will be described in detail.

This second embodiment is provided with the steering angle detector (the steering angle sensor 15) to detect the steering angle, and the vibration suppressor A2 controls the suppressing amount (the correction signal) according to the steering angle θ.

By controlling the vibration suppressing amount (the correction signal) according to the steering angle θ, the suppressing amount of the vibration suppressing control can be decreased to transmit the load surface information to the driver when the driver want to know the load surface information during the turning (specifically, when the steering angle θ is large).

Third Embodiment

Next, referring to FIG. 7, a third embodiment of the present invention that suppresses the vibration caused by the resonance will be described.

Figure 7:
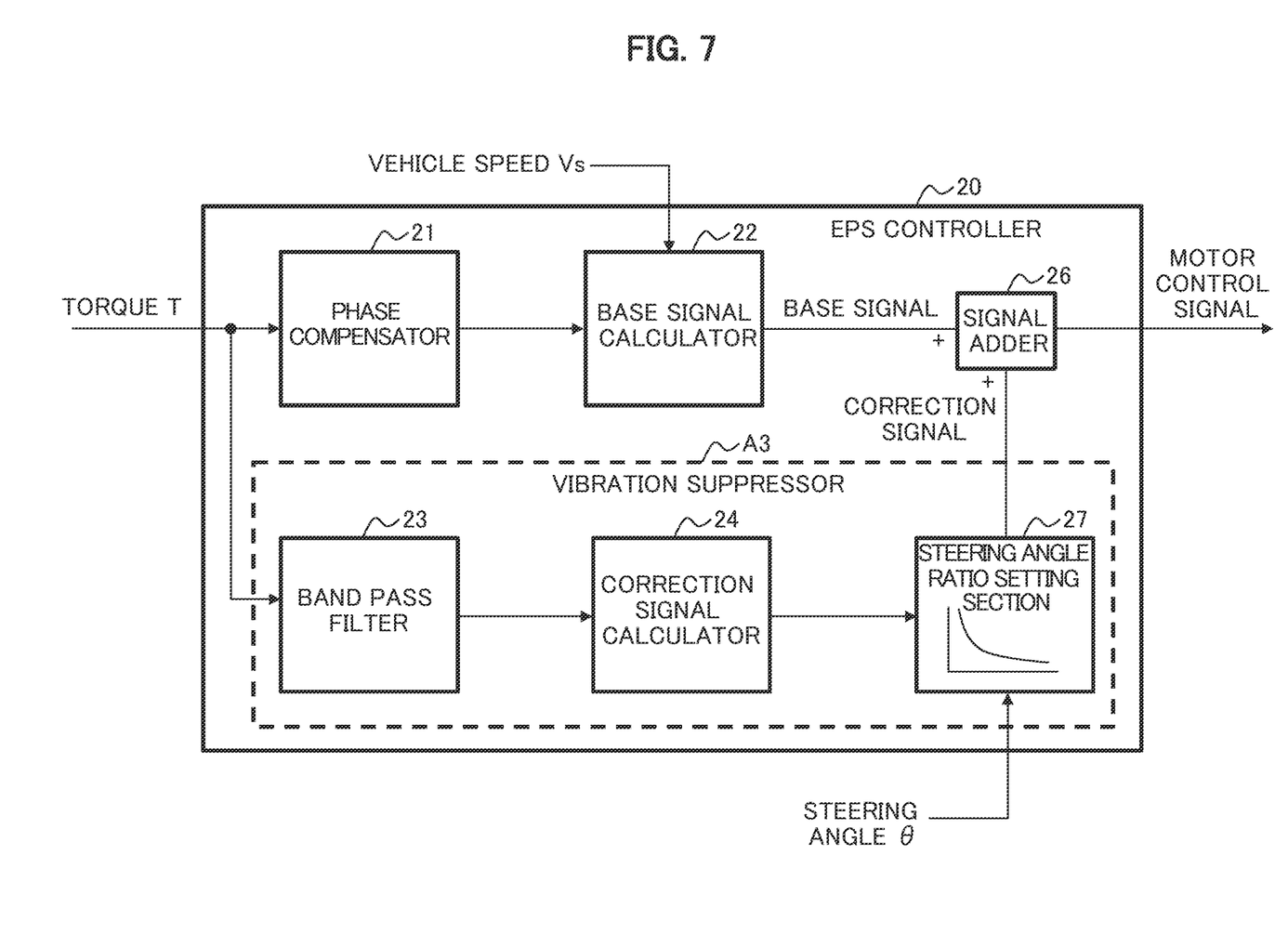
FIG. 7 is a block diagram of an EPS controller of a third embodiment of the present invention.

FIG. 7 is a block diagram of an EPS controller of the third embodiment of the present invention. In this third embodiment, a vibration suppressor A3 differs from the vibration suppressor A1 of the first embodiment and the vibration suppressor A2 of the second embodiment in the following points. The vibration suppressor A3 of the third embodiment has a configuration in which the switch 25 is omitted from the vibration suppressor A2 of the second embodiment. The other components are the same as those of the second embodiment, so duplicate descriptions will be omitted.

In the third embodiment shown in FIG. 7, regardless of the engine rotational speed Ne, the vibration suppressor A3 outputs the correction signal to the signal adder 26. However, during the turning when the driver wants to know the load surface information (when the steering angle is large), the steering angle ratio setting section 27 adjusts the correction signal to a smaller value. On the other hand, during the straight traveling or the traveling with the small steering angle where the driver is more concerned about the vibration, the steering angle ratio setting section 27 does not adjust the correction signal or adjusts it slightly. In other words, the vibration suppression and the transmission of the load surface information can be harmonized.

This third embodiment provides an electric power steering device with an abbreviated configuration that can appropriately suppress the vibration generated in the steering system S. In the straight traveling, etc., the vibration caused by the resonance can be effectively suppressed. In the turning, the vibration can be suppressed, and the load surface information can be transmitted to the driver.

In addition, depending on a setting of the steering angle ratio setting section 27, it is possible to set the correction signal to zero during the turning. Accordingly, it is also possible for the vibration suppressor A3 to "stop outputting" of the vibration suppressing force (the correction signal).

This third embodiment corresponds to the "second viewpoint" where the vibration suppressor A3 "stops and/or restricts" the output of the vibration suppressing force (the correction signal).

Modification

The present invention is not limited to the embodiments described above, but can be modified. For example, although the electric power steering device with the rack assist has been described, the present invention can also be applied to an electric power steering device with a column assist or a pinion assist. The present invention can also be used together with a damping control to increase stability at high speed, an inertia control to control an inertial force, and a return control, etc. In addition, although the vehicle provided with the engine as the power device has been described, the present invention can be applied to a vehicle provided with an electric motor for driving as a power device, i.e., an electric vehicle including a fuel cell vehicle. In other words, the present invention can be applied to electric vehicles including a fuel cell vehicle.

Although the steering angle detector based on the rotation of the steering shaft 3 and the position of rack shaft 9 has been described, steering angle detectors based on a steering angle estimated by a map matching or a forward monitoring camera in a navigation system are also acceptable. In other words, the navigation system and forward monitoring camera (including a LiDAR) can be used as steering angle detectors.

What is claimed is:

1. An electric power steering device comprising:
   a torque sensor provided between a steering wheel and steered wheels mounted on a vehicle body of a vehicle;
   an assist device that adds an assist force when the steered wheels are steered according to a torque detected by the torque sensor; and
   a vibration suppressor that outputs a vibration suppressing force from the assist device to suppress a vibration of a steering system according to a signal of a predetermined frequency band of the torque, wherein the vibration suppressor includes a band pass filter, a correction signal calculator, a switch, and a steering angle ratio setting section, and is controlled to output the vibration suppressing force when a rotational speed detected by a rotational speed detector that detects a rotational speed of a power device that drives the vehicle is a predetermined value, and the steering angle ratio setting section outputs a smaller correction signal in inverse proportion to a steering angle, wherein the vibration suppressor outputs the vibration suppressing force based on the correction signal.

2. The electric power steering device according to claim 1, wherein the steering system is attached to the vehicle body by a mounting part, the predetermined frequency band is a resonance frequency of the mounting part, and the predetermined value is an engine rotational speed range at which the mounting part resonates.

3. The electric power steering device according to claim 1, wherein a steering hanger beam is provided between walls on both sides of the vehicle body in a vehicle width direction, the steering system is attached to the steering hanger beam, the predetermined frequency band is a resonance frequency of the steering hanger beam, and the predetermined value is an engine rotational speed range at which the steering hanger beam resonates.

4. The electric power steering device according to claim 1, further comprising:

a steering angle detector to detect a steering angle, wherein the vibration suppressor controls a suppressing amount according to the steering angle.

5. An electric power steering device comprising:

a torque sensor provided between a steering wheel and steered wheels mounted on a vehicle body of a vehicle;

an assist device that adds an assist force when the steered wheels are steered according to a torque detected by the torque sensor;

a vibration suppressor that outputs a vibration suppressing force from the assist device to suppress a vibration of a steering system according to a signal of a predetermined frequency band of the torque; and a vibration occurrence determining device that determines whether the steering system vibrates according to an engine rotational speed, wherein the vibration suppressor includes a band pass filter, a correction signal calculator, a switch, and a steering angle ratio setting section, and is controlled to output the vibration suppressing force when the vibration occurrence determining device determines that the steering system vibrates, and the steering angle ratio setting section outputs a smaller correction signal in inverse proportion to a steering angle, wherein the vibration suppressor outputs the vibration suppressing force based on the correction signal.

6. An electric power steering device comprising:

a torque sensor provided between a steering wheel and steered wheels mounted on a vehicle body of a vehicle;

an assist device that adds an assist force when the steered wheels are steered according to a torque detected by the torque sensor; and a vibration suppressor that outputs a vibration suppressing force from the assist device to suppress a vibration of a steering system according to a signal of a predetermined frequency band of the torque, wherein the vibration suppressor includes a band pass filter, a correction signal calculator, a switch, and a steering angle ratio setting section, and is controlled to stop and/or limit the output of the vibration suppressing force based on an engine rotational speed detected by a rotational speed detector which detects a rotational speed of a power device that drives a vehicle, and/or a steering angle detected by a steering angle detector, and the steering angle ratio setting section outputs a smaller correction signal in inverse proportion to the steering angle, wherein the vibration suppressor outputs the vibration suppressing force based on the correction signal.

\* \* \* \* \*